US009664276B2

(12) United States Patent
TenBrink et al.

(10) Patent No.: US 9,664,276 B2
(45) Date of Patent: May 30, 2017

(54) TRANSMISSION ELECTRONIC SHIFTER WITH ADJUSTABLE DAMPED FRICTION CLUTCH

(71) Applicants: Jay T TenBrink, Goodrich, MI (US); Robert L Brown, Clarkston, MI (US); Donald Niskanen, Spring Lak, MI (US); Kirk Ypma, Rockford, MI (US)

(72) Inventors: Jay T TenBrink, Goodrich, MI (US); Robert L Brown, Clarkston, MI (US); Donald Niskanen, Spring Lak, MI (US); Kirk Ypma, Rockford, MI (US)

(73) Assignee: FCA US LLC, Auburn Hills, MI (US)

( * ) Notice: Subject to any disclaimer, the term of this patent is extended or adjusted under 35 U.S.C. 154(b) by 292 days.

(21) Appl. No.: 14/511,505

(22) Filed: Oct. 10, 2014

(65) Prior Publication Data
US 2015/0114157 A1 Apr. 30, 2015

Related U.S. Application Data

(60) Provisional application No. 61/895,203, filed on Oct. 24, 2013.

(51) Int. Cl.
*F16H 59/10* (2006.01)
*F16H 7/02* (2006.01)
(Continued)

(52) U.S. Cl.
CPC ............. *F16H 59/10* (2013.01); *F16F 7/023* (2013.01); *F16H 59/0204* (2013.01);
(Continued)

(58) Field of Classification Search
CPC ................... F16H 2059/0269; F16H 2061/247
See application file for complete search history.

(56) References Cited

U.S. PATENT DOCUMENTS 1,425,730 A * 8/1922 Whitted ................. B60K 20/02
403/144
2,100,642 A * 11/1937 Geyer ..................... B60K 20/02
403/114
(Continued)

FOREIGN PATENT DOCUMENTS

| EP | 2636926 A1 | 9/2013 |
| JP | 2009101914 A | 5/2009 |
| WO | 99/00265 A1 | 1/1999 |

OTHER PUBLICATIONS

International Search Report and Written Opinion dated Sep. 10, 2015 for International Application No. PCT/US2014/061673, International Filing Date Oct. 22, 2014.

*Primary Examiner* — Terence Boes
(74) *Attorney, Agent, or Firm* — Ralph E. Smith

(57) ABSTRACT

An electronic shifter can include a base, a shift lever assembly, a detent system and a clutch system. The shift lever assembly can include a pivot base having a coupling member. The detent system can include a biasing member and a detent member associated with the shift lever assembly. The biasing member can bias the detent member into engagement with a cam member. The clutch system can include a flexible clutch member and a bearing area having a bearing surface. The bearing area can be associated with the base and can receive the coupling member and clutch member to pivotably couple the shift lever assembly to the base. The detent system can apply a downward force onto the coupling member thereby forcing the clutch member against the bearing surface and providing frictional damping of the shift lever assembly during movement thereof proportional with a biasing force of the biasing member.

19 Claims, 9 Drawing Sheets

(51) Int. Cl.
*F16F 7/02* (2006.01)
*F16H 59/02* (2006.01)
*F16H 61/24* (2006.01)

(52) U.S. Cl.
CPC ............... *F16H 2059/0269* (2013.01); *F16H 2061/247* (2013.01); *Y10T 74/2003* (2015.01)

(56) References Cited

U.S. PATENT DOCUMENTS

| | | |
|---|---|---|
| 3,679,846 A | 7/1972 | Dillon et al. |
| 4,511,277 A * | 4/1985 | McCabe ................ B60K 20/02 384/203 |
| 6,237,435 B1 * | 5/2001 | Gronhage ........... F16H 59/0204 74/471 XY |
| 7,421,923 B2 | 9/2008 | Kim |
| 7,654,168 B2 | 2/2010 | O'Brien et al. |
| 7,966,905 B2 | 6/2011 | Komatsu et al. |
| 2009/0287383 A1 | 11/2009 | Fujii et al. |
| 2015/0114158 A1 * | 4/2015 | TenBrink ............ F16H 59/0278 74/473.25 |
| 2015/0260276 A1 * | 9/2015 | Okumoto ................ F16H 59/10 74/473.34 |

\* cited by examiner

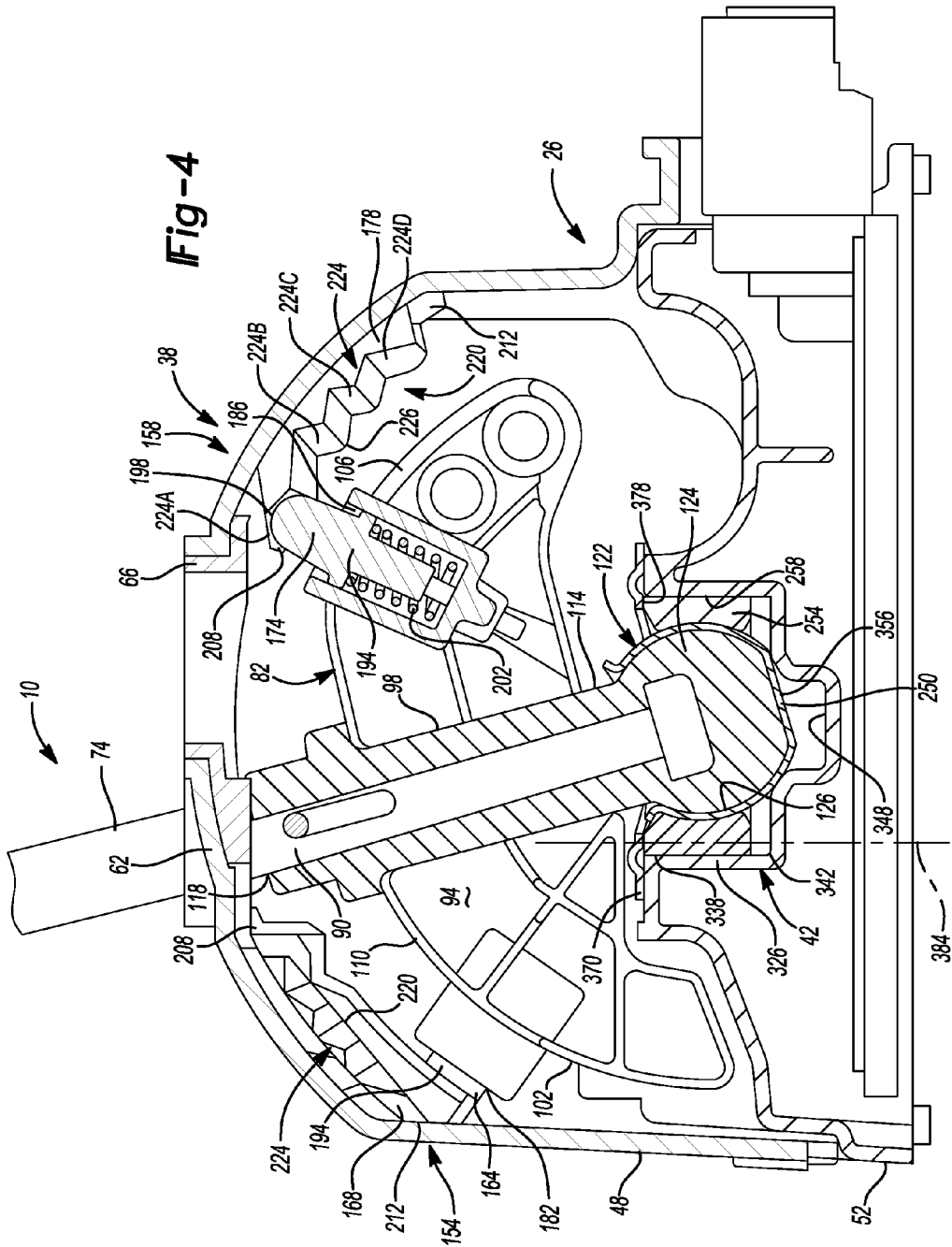

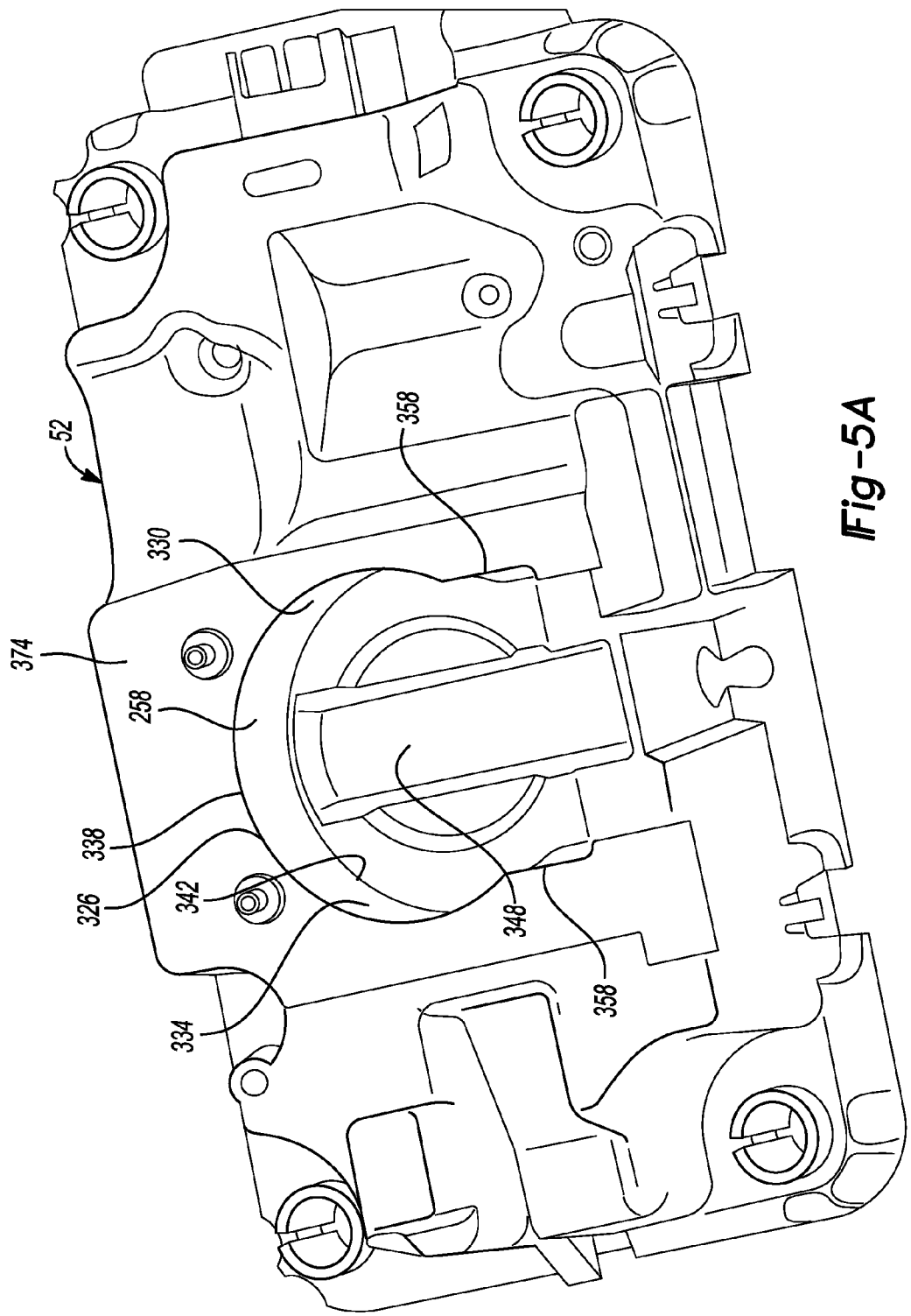

TRANSMISSION ELECTRONIC SHIFTER WITH ADJUSTABLE DAMPED FRICTION CLUTCH

CROSS-REFERENCE TO RELATED APPLICATION

This application claims the benefit of U.S. Provisional Ser. No. 61/895,203, filed Oct. 24, 2013.

FIELD

The present disclosure relates generally to a transmission electronic shifter and, more particularly, to a poly-stable lever style electronic shifter with an adjustable friction clutch.

BACKGROUND

More and more vehicles are being equipped with electronic shifters ("e-shifters") to place the vehicle's automatic transmission into a desired gear state. Electronic shifters can replace the traditional console mounted P-R-N-D-L mechanical shift lever and are typically implemented as levers, which can be pushed up/down or sideways, and/or buttons to effect gear changes. The typical mono-stable lever type electronic shifter returns to its original or home position after it has been manipulated by the driver. A more recent development is to have a multi-position stable or poly-stable e-shifter that retains an actuator setting that represents a driver requested transmission gear state. With the poly-stable e-shifter, the shift lever can retain a manipulated position of the shift lever and, as such, is preferred by many drivers. The shift-by-wire transmissions associated with these mono-stable and poly-stable e-shifters typically do not include a mechanical cable or link to the e-shifter and the detent member incorporated within a mechanically shifted transmission, which can provide damping to the mechanical system. Accordingly, there is a need for improvement in the relevant art.

SUMMARY

In one form, an electronic shifter assembly for a shift-by-wire transmission is provided in accordance with the teachings of the present disclosure. The electronic shifter assembly can include a base, a shift lever assembly, a detent system and a clutch system. The shift lever assembly can include a pivot base having a coupling member. The detent system can include a biasing member and a detent member associated with the shift lever assembly, where the biasing member can bias the detent member into engagement with a cam member that can be coupled to the base. The clutch system can include a flexible clutch member and a bearing area having a bearing surface. The bearing area can be associated with the base and can be configured to receive the coupling member with the flexible clutch member associated therewith to pivotably couple the shift lever assembly to the base. The detent system can be configured to apply a downward force onto the coupling member thereby forcing the flexible clutch member against the bearing surface and providing tuned frictional damping of the shift lever assembly during movement thereof proportional with a biasing force of the biasing member.

In another form, an electronic shifter assembly for a shift-by-wire transmission is provided in accordance with the teachings of the present disclosure. The electronic shifter assembly can include a base, a shift lever assembly, a detent system and a clutch system. The base can include an upper base member coupled to a lower base member. The shift lever assembly can include a pivot base having a coupling member. The detent system can include a biasing member and a detent member associated with the shift lever assembly. The biasing member can bias the detent member into engagement with a cam member coupled to the upper base member. The clutch system can include a flexible clutch member and a bearing socket having a bearing surface defined by the lower base member. The bearing socket can be configured to receive the coupling member with the flexible clutch member associated therewith to pivotably couple the shift lever assembly to the base. The flexible clutch member can be positioned between the coupling member and the bearing surface when pivotably coupled to the base. The detent system can be configured to apply a downward force onto the coupling member thereby forcing the flexible clutch member against the bearing surface and providing tuned frictional damping of the shift lever assembly during movement thereof proportional with a biasing force of the biasing member.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is a partial sectional view of the poly-stable electronic shifter assembly illustrating features of an exemplary dual mechanical detent system in cooperation with an exemplary friction clutch system according to the principles of the present disclosure;

FIG. 5A is a perspective view of lower base member of a base assembly according to the principles of the present disclosure;

DESCRIPTION

Figure 1:
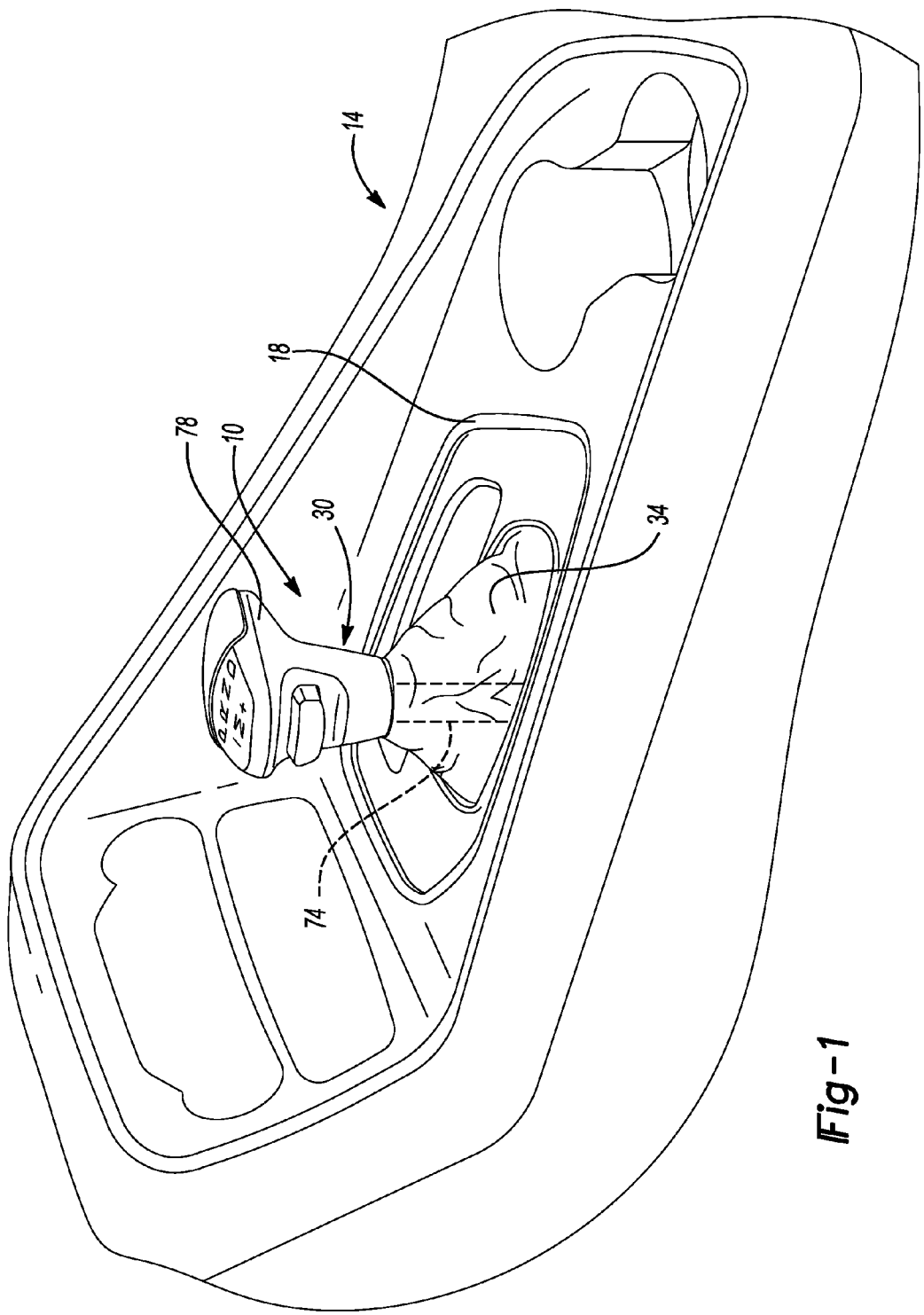
FIG. 1 is a perspective view of an exemplary poly-stable electronic shifter assembly associated with an exemplary center console of a vehicle interior according to the principles of the present disclosure.

With initial reference to FIG. 1, an exemplary poly-stable electronic shifter assembly is shown and generally identified at reference numeral 10. As shown, the poly-stable electronic shifter assembly 10 can be associated with a center console 14 of an interior of a vehicle. In the exemplary implementation illustrated in FIG. 1, the poly-stable electronic shifter assembly 10 can be surrounded by a trim panel or member 18, such as an interior surface panel. It should be appreciated, however, that the poly-stable electronic shifter assembly 10 could be packaged in the vehicle's interior in various different configurations, including positions other than the center console 14 (e.g., an instrument panel) and with or without trim member 18.

As discussed above, one of the benefits of a poly-stable electronic shifter includes an ability for a shift lever to remain in a position it is placed in by a user or driver for selecting a transmission gear. Typical transmission gears to be selected are park, reverse, neutral and drive (PRND). As also discussed above, electronic shifters associated with shift-by-wire transmissions do not include a mechanical cable or link to the transmission, as would be the case for a mechanical shifter associated with a mechanically shifted transmission. The cable and shift systems of the mechanically shifted transmissions can also include a detent system incorporated into the transmission, which can provide damping to the system.

Accordingly, a poly-stable electronic shifter assembly 10 having a damped friction clutch system for use with a shift-by-wire automatic transmission is provided in accordance with various aspects of the present disclosure. In one exemplary configuration, the poly-stable electronic shifter assembly 10 can include an adjustable or tunable damped friction clutch system housed within a base of the shifter assembly. In this exemplary configuration, the damped friction clutch system can cooperate with a dual mechanical detent system, which can also be housed within the base. As will be discussed in greater detail below, the adjustable damped friction system can be tunable so as to provide internal damping to provide a smooth, controlled shifter feel. In one exemplary configuration, the adjustable damped friction clutch can provide a shifter feel comparable to the shifter feel of a mechanical shift system associated with a mechanically shifted transmission, and can provide internal damping making it easier for a driver to select a desired transmission gear while minimizing potential overshoot.

With continuing reference to FIG. 1 and additional reference to FIGS. 2A-4, the poly-stable electronic shifter assembly 10 can include a base 26, a shift lever assembly 30 pivotably coupled to the base 26, a flexible member covering or boot 34, a dual mechanical detent system 38 housed within base 26, and a friction clutch system 42 also housed within base 26.

The base 26 can be adapted to be fixedly attached to a vehicle, such as in association with the center console 14 shown in FIG. 1. It should be appreciated, however, that the base 26 along with the components of poly-stable electronic shifter assembly 10 can be attached or positioned in various interior locations of the vehicle. The base 26 can be formed from any suitable materials, such as plastic, and can be provided in a one-piece construction or can be constructed of multiple components secured together.

In the exemplary configuration illustrated, the base 26 can be provided in a two-piece construction having an upper base member 48 and a lower base member 52. The upper and lower base members 48, 52, when assembled together, can form an outer base housing 56 (FIG. 2A). It should be appreciated, however, that base 26 could also be provided with a separate outer housing formed from one or more pieces or members. The upper base member 48 can include an upper end 62 having or defining a gate guide 66 configured to aid in guiding the shift lever assembly 30 along a travel path or axis 70 between and among park (P), reverse (R), neutral (N) and drive (D) (PRND) gear selection locations, as will be discussed in greater detail below.

The shift lever assembly 30 can include a shift lever 74, a shift knob 78 and a shift lever pivot base 82. The shift lever 74 can include a first or upper end 86 coupled to the shift knob 78 and a second or lower end 90 fixed to the shift lever pivot base 82. The shift lever pivot base 82 can include a body 94 defining a central bore 98 and first and second body members 102, 106 extending in opposite directions from central bore 98. In the exemplary configuration illustrated, the first and second body members 102, 106 can extend in directions substantially in-line or substantially parallel to the travel axis 70 of the shift lever assembly 30, which will be discussed in greater detail below.

The body 94 can include an upper end or surface 110 and a lower end or surface 114, as shown for example in FIG. 4. The upper surface 110 can define an opening 118 of central bore 98 and the lower surface 114 can define a coupling member 122. The lower end 90 of shift lever 74 can be received in opening 118 and fixed to central bore 98. In one exemplary aspect, the coupling member 122 can include a male coupling member, such as a ball pivot member 124, with at least a portion of its outer surface 126 being spherical or substantially spherical. The coupling member 122 can cooperate with the adjustable friction clutch system 42 to pivotably couple the shift lever assembly 30 to base 26, as will be discussed in greater detail below.

Figure 2:
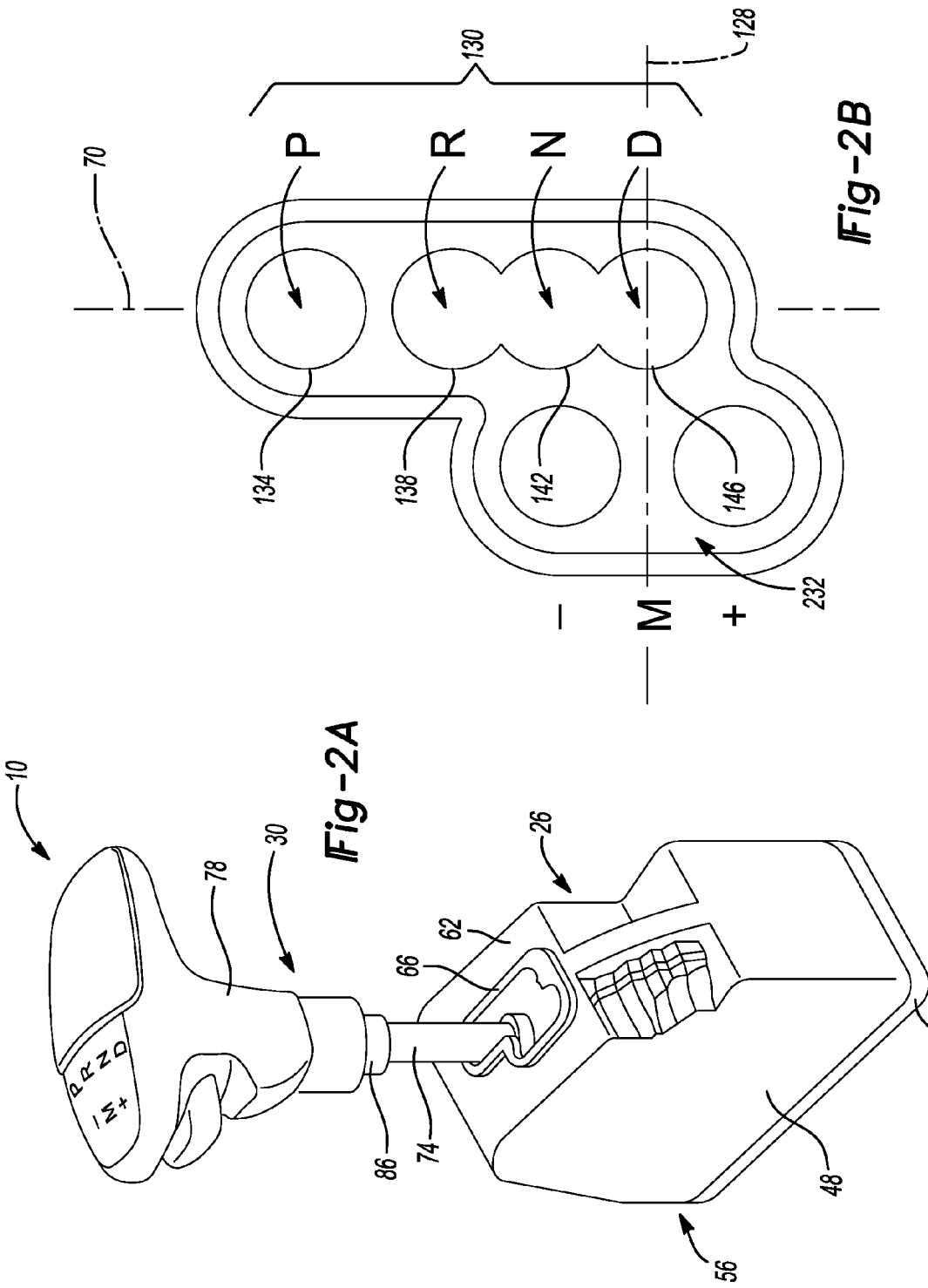
FIG. 2A is a perspective view of the poly-stable electronic shifter assembly of FIG. 1 with a flexible member removed according to the principles of the present disclosure.
FIG. 2B is a schematic view of an exemplary shift pattern illustrating positions of a shift lever relative to a gate guide according to the principles of the present disclosure.
Figure 3:
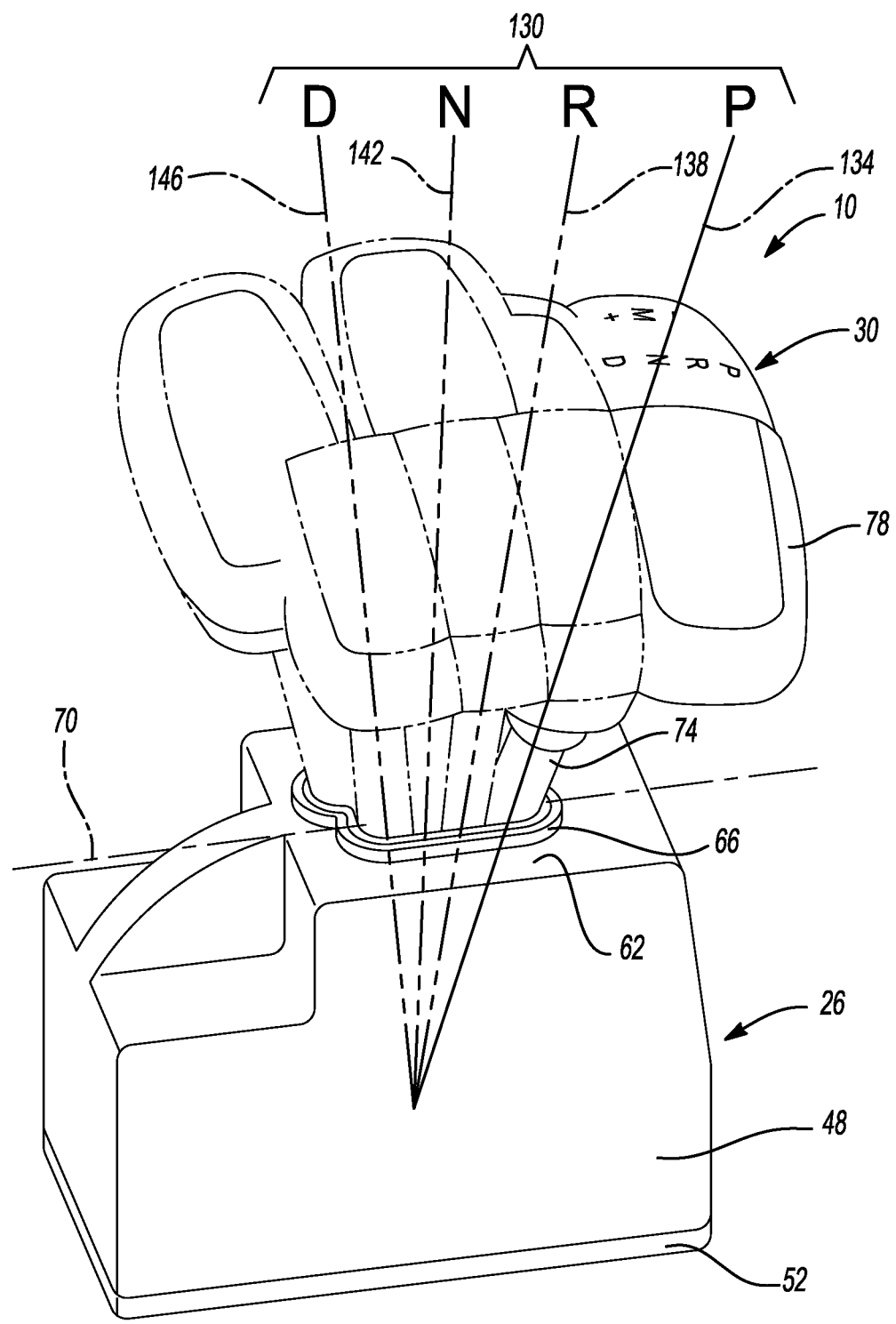
FIG. 3 is a side view of the poly-stable electronic shifter assembly illustrating the shift lever in various transmission gear selection locations according to the principles of the present disclosure.

The shift lever assembly 30 can be pivotable as a unit relative to base 26 and gate guide 66 along travel axis 70 among the PRND gear selection locations 130 (FIG. 3). In other words, pivotal movement of the shift lever 74 correspondingly moves the shift lever pivot base 82 therewith. The shift lever assembly 30 can also be pivotable along a lateral axis 128 perpendicular to or substantially perpendicular to travel axis 70 to place the shift lever assembly 30 in a manual-automatic gear selection mode. With particular reference to FIGS. 2B-3, the poly-stable shift lever assembly 30 is shown in the PRND gear selection locations 130, as well as in manual-automatic positions (e.g., "+" and "−"). For purposes of this discussion, however, the manual-automatic positions will not be discussed in greater detail herein. The PRND gear selection locations 130 can include a park (P) gear selection location 134, a reverse (R) gear selection location 138, a neutral (N) gear selection location 142, and a drive (D) gear selection location 146, as shown in FIGS. 2B and 3.

With particular reference to FIGS. 4-9 and continuing reference to FIGS. 1-3, the dual mechanical detent system 38 of the poly-stable electronic shifter assembly 10 will now be discussed in greater detail. The dual mechanical detent system 38 can include first and second mechanical detent systems 154, 158. The first mechanical detent system 154 can include a first detent plunger 164 and a first detent cam member 168. Similarly, the second mechanical detent system 158 can include a second detent plunger 174 and a second cam member 178. The first and second detent plungers 164, 174 can be configured to engage and cooperate with the respective first and second cam members 168, 178, as will be discussed in greater detail below.

Figure 7:
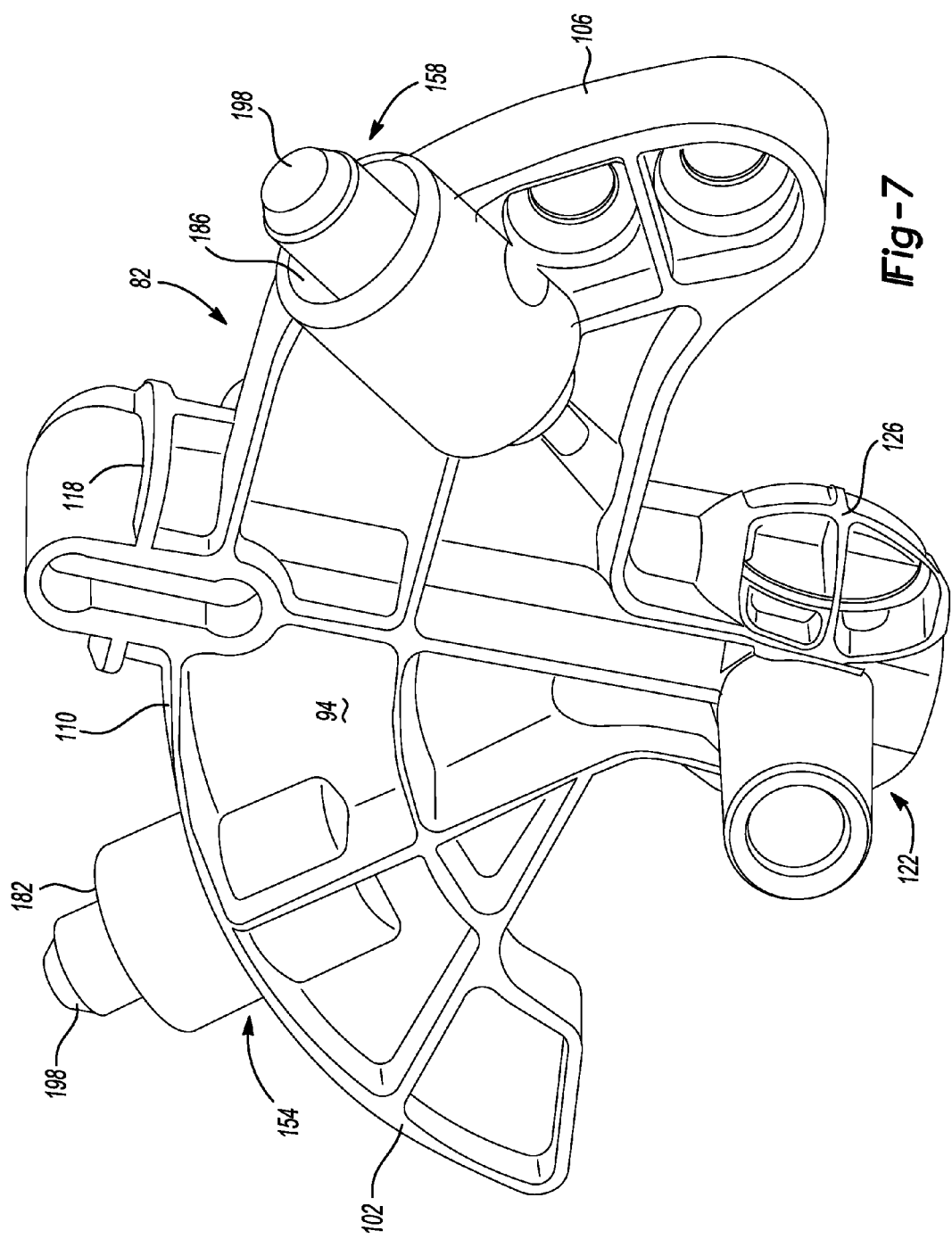
FIG. 7 is a view of a shift lever pivot base according to the principles of the present disclosure.
Figure 8:
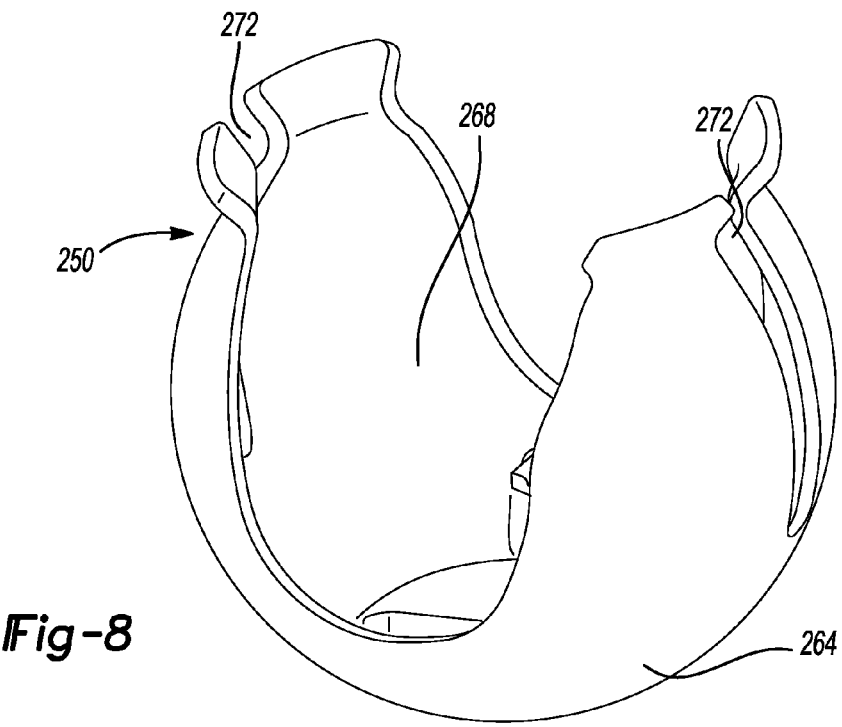
FIG. 8 is a view of a pivot member of the friction clutch system according to the principles of the present disclosure.
Figure 9:
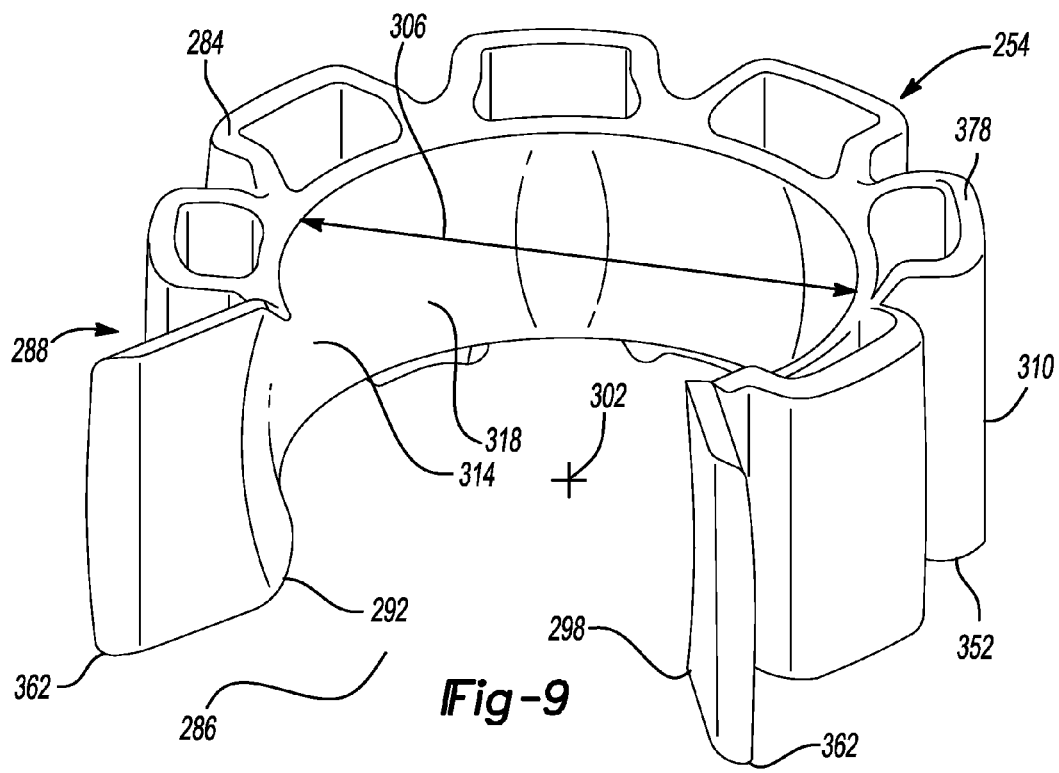
FIG. 9 is a view of a clutch member of the friction clutch system according to the principles of the present disclosure.

In the exemplary configuration illustrated in the various figures, the first and second detent plungers 164, 174 can be positioned in first and second bores 182, 186 defined by the respective first and second body members 102, 106 of shift lever pivot base 82, as shown for example in FIGS. 4 and 7. With particular reference to FIGS. 4 and 7, the first and second bores 182, 186, and thus the first and second detent plungers 164, 174 can be positioned about opposite longitudinal sides of the central bore 98 and each at an acute angle relative thereto.

The first and second detent plungers 164, 174 can each include a body 194 having a cam member engaging upper end 198 and an opposed end or area in engagement with a biasing member 202. In the exemplary configuration illustrated in FIGS. 4 and 6, the biasing member 202 can be a spring configured to urge or bias the upper end 198 in a direction away from the coupling member 122 (e.g., toward the respective cam members). It should be appreciated, however, that the first and second detent plungers 164, 174 can be provided in various different configurations that include an engagement and biasing function.

The first and second cam members 168, 178 can each be attached to the base 26 such that the shift lever assembly 30 and first and second detent plungers 164, 174 associated therewith move relative to the cam members 168, 178. In the exemplary configuration illustrated in FIGS. 4-7, the first cam member 168 can be positioned adjacent to and spaced apart from the first body member 102. Similarly, the second cam member 178 can be positioned adjacent to and spaced apart from the second body member 106. In this exemplary configuration, the first and second cam members 168, 178 can be spaced apart from each other and positioned about or substantially about opposite longitudinal ends of gate guide 66 such that the shift lever 74 pivots between the first and second cam members 168, 178 along travel axis 70.

The first and second cam members 168, 178 can each include a first end 208 positioned toward or facing the shift lever 74 and a second opposed end 212. The first and second cam members 168, 178 can define an overall arcuate surface 216 (FIG. 6) between the first and second ends 208, 212. The first and second cam members 168, 178 can each define a cam profile or surface 220 formed by a plurality of grooves or detent positions 224 corresponding to various gear selection locations in which the shift lever assembly 30 can be shifted to place the transmission in a desired gear. Each detent groove or position 224 can be separated by a ridge or protrusion 226 positioned therebetween, as shown for example in FIG. 6.

For example, each of the cam surfaces 220 can define detent positions 224 corresponding to the PRND gear selection locations 130. In particular, the first and second cam members 168, 178 can define a park detent position 224A, a reverse detent position 224B, a neutral detent position 224C and a drive detent position 224D, as shown for example in FIGS. 4 and 6. In one exemplary configuration, one or more of the first and second cam members 168, 178 can be laterally offset from the travel axis 70 and/or each other. In the exemplary configuration illustrated in FIGS. 4-7, the second cam member 178 can be laterally offset from the first cam member 168 and the travel axis 70.

It should be appreciated that the first and second cam members 168, 178 can include a suitable width in the lateral direction so as to have the capability to handle lateral movement of the shift lever assembly 30 and thus corresponding lateral movement of the detent plungers 164, 174. For example, the shift lever assembly 30 may be moved laterally along or parallel to the lateral axis 128 to the manual-automatic gear selection locations. In this example, the cam members 168, 178 can include the cam surface profile 220 having sufficient width to handle such lateral movement of the detent plungers 164, 174, as well as incorporate corresponding manual-automatic detent positions 232, as best shown in FIG. 6.

As briefly discussed above, each of the first and second detent plungers 164, 174 can be biased into engagement with the cam surfaces 220 of the respective first and second cam members 168, 178. In particular, the upper ends 198 can be biased into engagement with the respective cam surfaces 220. As the shift lever assembly 30 is pivoted from the park gear selection location 134 along travel axis 70 to the drive gear selection location 146, the upper end 198 of the first detent plunger 164 can engagingly follow the cam member profile 220 of first cam member 168, and the upper end 198 of the second detent plunger 174 can simultaneously engagingly follow the cam member profile 220 of the second cam member 178.

With additional reference to FIGS. 5A-9 and continuing reference to FIGS. 1-4, the structure and operation of friction clutch system 42 will now be discussed. In the exemplary configuration illustrated, the friction clutch system 42 can include a tunable damped frictional clutch system 42 configured to cooperate with the dual mechanical detent system 38 and the shift lever pivot base 82 to provide tuned internal damping to the poly-stable shift lever assembly 30. As discussed above, such internal damping can provide for a smoother and more controlled shift lever movement experience, as well as make it easier for a user to select a desired gear selection location while minimizing overshoot.

Figure 6:
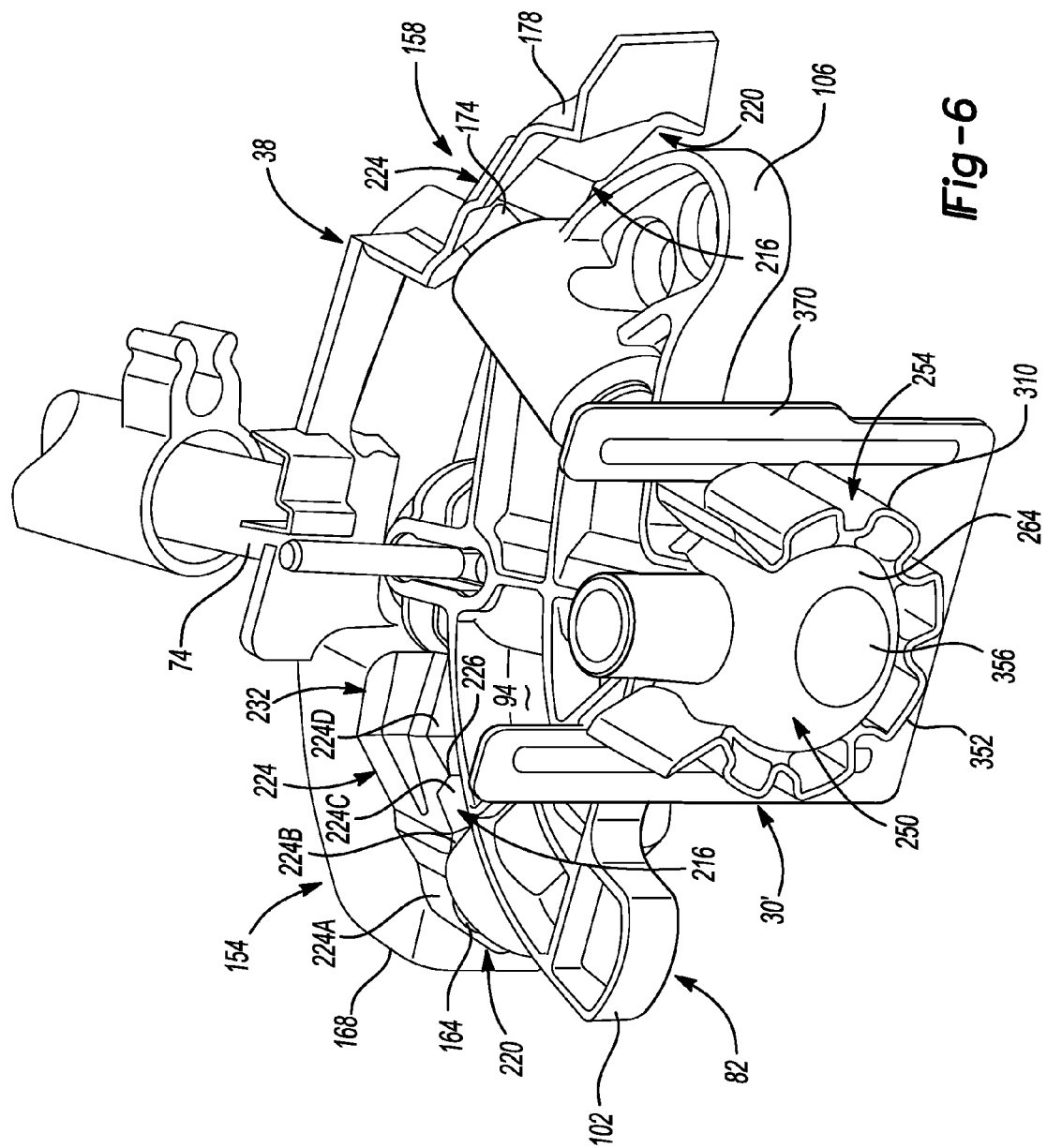
FIG. 6 is a view of a shift lever assembly and the friction clutch system with portions of the base removed for clarity of illustration according to the principles of the present disclosure.

The friction clutch system 42 can include a pivot member 250, a clutch member 254 and a bearing member or reaction surface 258, as shown for example in FIG. 6. The pivot member 250 can, in one exemplary configuration, be coupled to the outer surface 126 of coupling member 122 of pivot base 82. In this exemplary configuration, the pivot member 250 can include a substantially spherical outer surface portion 264 configured to engage the clutch member 254, as will be discussed in greater detail below. The substantially spherical outer surface portion 264 can include a substantially smooth outer surface. The pivot member 250 can include a hollow interior 268 sized and shaped to be complimentary to a size and shape of the outer surface 126 of male coupling member 122. In the exemplary configuration illustrated in FIGS. 6-8, the pivot member 250 can include one or more slots or channels 272 to aid in coupling pivot member about male coupling member 122.

It should be appreciated that while the pivot member 250 is shown as a separate component from male coupling member 122 of pivot base 82, the pivot member 250 could also be integrally formed with or as part of the pivot base 82. In this configuration, the male coupling member 122 could include a substantially smooth outer surface portion having a spherical or substantially spherical shape and an exterior size and shape of the pivot member 250.

The clutch member 254 can, in the exemplary configuration illustrated, be a flexible clutch member 254 configured to engage and be positioned between the pivot member 250 and the bearing surface 258, as shown for example in FIG. 6 with reference to FIG. 4. In one exemplary configuration, the flexible clutch member 254 can include a body 284 defining a C-shape 288. The C-shaped body 284 can form an opening 286 between first and second ends 292, 298. The C-shaped body can be flexible in a radial direction relative to a center point 302 so as to increase or decrease an inner diameter 306, as will be discussed in greater detail below.

Figure 5B:
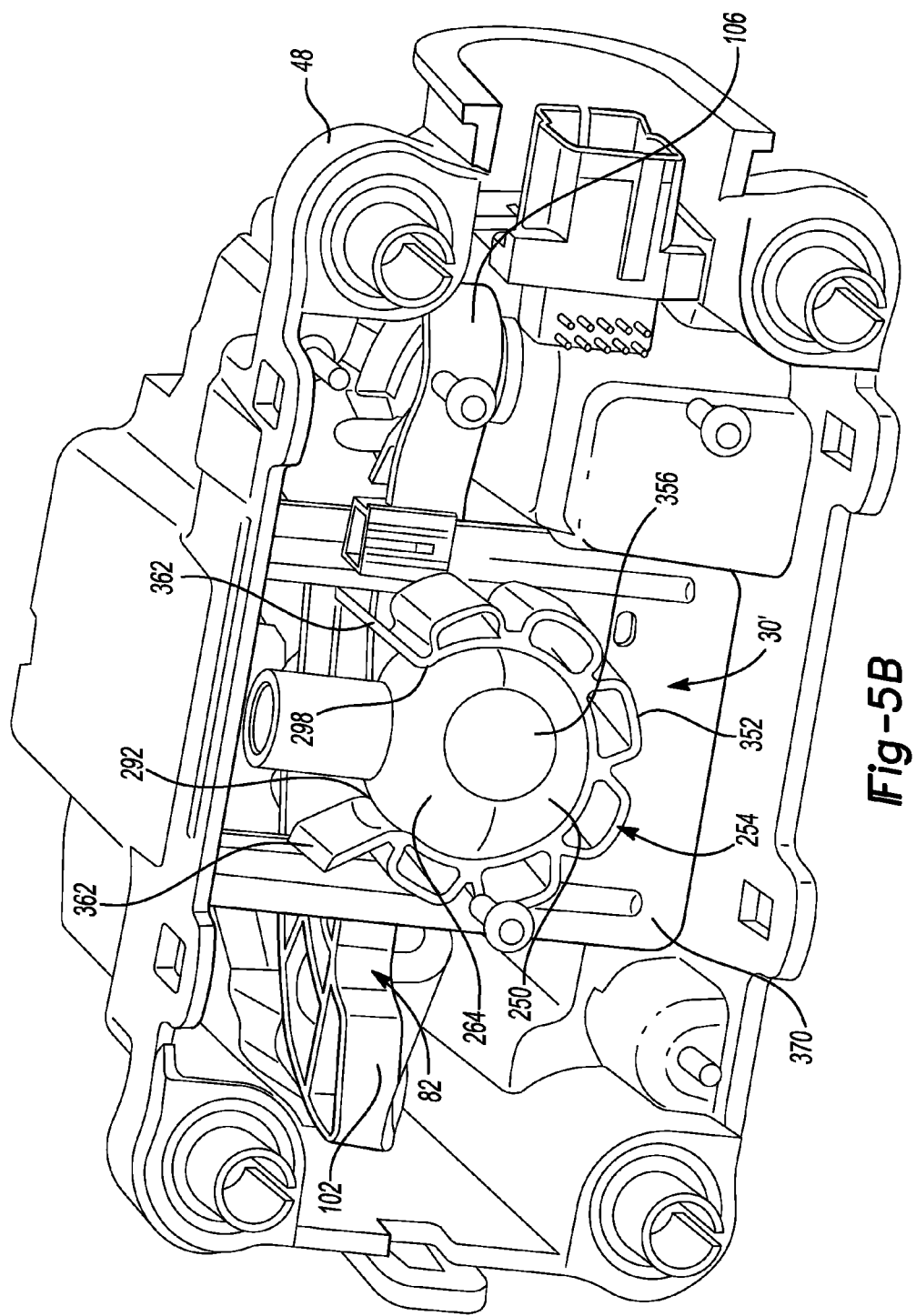
FIG. 5B is a perspective view of an upper base member of the base assembly with the shift lever assembly and clutch system associated therewith according to the principles of the present disclosure.

The C-shaped body 284 can include an outer side 310 and an opposed inner side 314. The outer side 310 can be configured to engage the bearing surface 258 and the inner side 314 can be configured to engage the pivot member 250. The inner side 314 can include a substantially spherical surface 318 in cross-section so as to be complimentary to the spherical outer surface portion 264 of pivot member 250. As can be seen in FIGS. 5B and 6, the flexible clutch member 254 can be slidably coupled to the pivot member 250 and removably retained thereon such that the inner surface 318 engages the outer surface portion 264 of pivot member 250. In one exemplary configuration, the C-shaped body 284 can be substantially incompressible in the radial direction such that a radially inward force applied to outer side 310, for example by bearing surface 258, can cause the C-shaped body 284 to grow circumferentially thereby reducing the inner diameter 306, as will be discussed in greater detail below.

The bearing member or reaction surface 258 can, in the exemplary configuration illustrated, be integrally formed in the lower base member 52 as can be seen in FIGS. 4 and 5A. Alternatively, the bearing member or reaction surface 258 can be a separate component fixed or secured to the lower base member 52. With particular reference to FIG. 5A, the bearing member 258 can include a female recess or socket 326 having a substantially cylindrical shape 330. An inner wall 334 of the bearing member 258 can be tapered such that the female socket 326 has a larger width or diameter at an upper end 338 than at a lower end 342. The tapered inner wall 334 can form the bearing or reaction surface 258 that engages the outer side 310 of the flexible clutch member 254, as will be discussed in greater detail below.

The socket 326 can be sized (e.g., width or diameter) such that the male coupling member 122 with the pivot member 250 and flexible clutch member 254 coupled thereto can be received in the socket 326 with the outer surface 310 of flexible clutch member 254 in engagement with the tapered inner wall 334. For discussion purposes only, the shift lever assembly 30 with the pivot member 250 and flexible clutch member 254 coupled thereto in the manner discussed above can hereinafter be referred to as the clutched shift lever assembly 30' (FIG. 6). In one exemplary configuration, outer surface 310 of flexible clutch member 254 can engage the tapered inner sidewall 334 so as to support the clutched shift lever assembly 30' spaced apart from or in spaced relation to a bottom surface 348 of socket 326. In other words, a lower end 352 of the flexible clutch member 254 can be spaced apart from the lower end 342 of tapered inner wall 334 and a lower end 356 of male pivot 250 can be spaced apart from bottom surface 348.

As will be discussed in greater detail below, a downward force applied to the shift lever pivot base 82 can force the clutched shift lever assembly 30' (and thus the male coupling member 122) downward toward the bottom surface 348 thereby reducing the inner diameter of 306 of flexible clutch member 254. This reduced inner diameter 306 of clutch member 254 can provide an increased friction force on pivot member 250 thereby providing increased resistance to pivotal movement of clutched shift lever assembly 30'.

The socket 326 can include first and second radially outwardly extending cut-outs 358 configured to receive first and second ends 292, 298 of flexible clutch member 254. In the exemplary configuration illustrated, the first and second ends 292, 298 can include outwardly extending projections 362 configured to be received in the cut-outs 358 when the clutched shift lever assembly 30' is positioned in socket 326 in the manner discussed above. The cut-outs 358 can provide for maintaining an orientation of the clutch member 254 relative to the socket 326 while providing for circumferential and radial movement of the flexible clutch member 254 responsive to a downward force applied to the clutched shift lever assembly 30', as will be discussed in greater detail below.

With the clutched shift lever assembly 30' positioned relative to socket 326 of base 26 in the manner discussed above, a plate member 370 can be positioned over the flexible clutch member 254 and secured to an upper surface 374 of lower base member 52 adjacent socket 326, as shown for example in FIG. 4 with reference to FIGS. 5A-5B. The plate member 370 can, in one exemplary configuration, engage an upper surface 378 of flexible clutch member 254, as shown for example in FIG. 4.

With particular reference to FIGS. 4-6, assembly and operation of the poly-stable electronic shift lever assembly 10 will now be discussed. As discussed above, the pivot member 250 and the flexible clutch member 254 can be coupled to the pivot base 82 thereby forming, for discussion purposes, the clutched shift lever assembly 30'. The clutched shift lever assembly 30' can be positioned in base 26 in the manner discussed above such that the first and second detent plungers 164, 174 are biased into engagement with the respective first and second cam members 168, 178, and the flexible clutch member 254 is in engagement with tapered inner wall 334.

In this configuration, the lower end 352 of the flexible clutch member 254 can be spaced apart from the lower end 342 of tapered inner wall 334 and the lower end 356 of male pivot 250 can be spaced apart from bottom surface 348 of lower base member 52 while the upper end of pivot base 82 can be spaced apart from the adjacent cam members 168, 178. In other words, the clutched shift lever assembly 30' can move in a direction toward and away from the bottom surface 348 of lower base member 52 and the cam members 168, 178 under the biasing forces of the detent plungers 164, 174 and the friction clutch system 42. In this configuration, the coupling member 122, pivot member 250 and flexible clutch member 254 can move as a unit in the manner discussed above along or substantially along an axis 384 of socket 326.

In operation, the detent plungers 164, 174 can apply a downward force (via biasing members 202) onto the coupling member 122, which forces the pivot member 250 against the inner wall or side 314 of the flexible clutch member 254 and the outer wall or side 310 of the flexible clutch member 254 against the tapered inner wall 334 of socket 326.

This action also forces the clutched shift lever assembly 30' downward toward bottom surface 348 of lower base member 52. As a result, the flexible clutch member 254 reacts against the decreasing diameter or width of tapered inner wall 334 and provides an increased frictional force on the spherical outer surface 264 of the pivot member 250. In other words, the decreasing diameter of the tapered inner wall 334 reacting against the flexible clutch member 254 forces the internal diameter 306 of the flexible clutch member 254 to be reduced. This, in turn, causes the increased friction force on pivot member 250 as the flexible clutch member 254 essentially clamps down on the pivot member 250. The friction force imparted on the pivot member 250 can increase proportionally with the downward detent force provided by the dual mechanical detent system 38.

The downward force provided by the detent plungers 164, 174 can be tuned in connection with the friction clutch system 42 to provide a desired amount of damping in connection with movement of the poly-stable shift lever assembly 30. For example only, an increase in the detent force by detent plungers 164, 174 can provide an increased amount of frictional resistance from the clutch system 42 as the higher detent force can drive the clutched shift lever assembly 30' further toward the bottom surface 348 and thus cause a larger reduction in the inner diameter 306 of the clutch member 254.

The increase in the detent force can, in one exemplary implementation, be provided by a larger spring force. The size of the plurality of ridges 226 and a size of the detent grooves 224 can also be varied to increase or decrease the detent force. For example, larger ridges 226 can cause greater compression of the spring 202, which can cause the increased force by the detent plungers discussed above. In addition, deeper detent grooves 224 associated with the larger ridges 226 can aid in minimizing overshoot when selecting one of the gear selection locations 130. For example, moving the detent plungers over the ridges 226 can cause an increase in the detent force by the detent plungers 164, 174, which can cause an increased amount of frictional resistance from the clutch system 42. Moving the detent plungers 164, 174 into the detent grooves 224 can result in a decrease in the detent force by the detent plungers 164, 174, which can result in less frictional resistance by the clutch system 42.

Thus, the poly-stable electronic shifter assembly can include an adjustable or tunable damped friction clutch system housed within a base of the shifter assembly. In one exemplary configuration, the damped friction clutch system can cooperate with the dual mechanical detent system, which can also be housed within the base. The adjustable damped friction system can be tunable so as to provide internal damping to provide a smooth, controlled shifter feel. The internal damping can be associated with the friction force of the friction clutch system discussed above, which can increase proportionally with the detent force from the dual mechanical detent system. In one exemplary configuration, the adjustable damped friction clutch can provide a shifter feel comparable to the shifter feel of a mechanical shift system associated with a mechanically shifted transmission, and can provide internal damping making it easier for a driver to select a desired transmission gear while minimizing potential overshoot.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electronic shifter assembly for a shift-by-wire transmission, comprising:
a base;
a shift lever assembly including a pivot base having a coupling member;
a detent system including a biasing member and a detent member associated with the shift lever assembly, the biasing member biasing the detent member into engagement with a cam member coupled to the base; and
a clutch system including a flexible clutch member and a bearing area having a tapered bearing surface, the bearing area defined by the base and configured to receive the coupling member with the flexible clutch member coupled thereto to pivotably couple the shift lever assembly to the base such that the flexible clutch member extends partially around the coupling member with an inner surface of the flexible clutch member bearing on the coupling member and an outer surface of the flexible clutch member engaging and reacting against the tapered bearing surface;
wherein the detent system is configured to apply a downward force onto the coupling member thereby causing corresponding downward movement of flexible clutch member relative to a decreasing diameter of the tapered bearing surface such that an inner diameter of the flexible clutch member is reduced thereby applying increased frictional force on the coupling member so as to cause increased frictional resistance to pivotal movement of the shift lever assembly and provide tuned frictional damping of the shift lever assembly during movement thereof proportional with a biasing force of the biasing member.

2. The shifter assembly of claim 1, wherein the bearing area includes a female socket defined by the base and the bearing surface includes a tapered inner sidewall defined by the female socket.

3. The shifter assembly of claim 2, wherein the base includes an upper base member coupled to a lower base member, the lower base member being positioned under the upper base member and including the bearing area, the cam member coupled to the upper base member.

4. The shifter assembly of claim 2, further comprising a pivot member coupled to the coupling member, the pivot member forming a male outer pivot surface of the coupling member.

5. The shifter assembly of claim 4, wherein the male outer pivot surface includes a substantially spherical surface.

6. The shifter assembly of claim 3, wherein the coupling member with the flexible clutch member coupled thereto is pivotably positioned in the female socket.

7. The shifter assembly of claim 6, wherein the downward force applied by the detent system urges the pivot base downward in a direction away from the cam member and away from the upper base member.

8. The shifter assembly of claim 7, wherein the flexible clutch member comprises a C-shaped flexible clutch member.

9. The shifter assembly of claim 8, wherein the C-shaped flexible clutch member is substantial incompressible in a radial direction such that a radially inward force applied to the outer surface by movement of the C-shaped flexible clutch member relative to the decreasing diameter of the tapered bearing surface causes the C-shaped flexible clutch member to expand in a circumferential direction thereby reducing the internal diameter thereof and applying the increased frictional force on the coupling member.

10. The shifter assembly of claim 7, wherein the cam member includes a cam surface in engagement with the detent member, the cam surface including a plurality of detent grooves corresponding to gear selection locations and a corresponding plurality of ridges between the detent grooves.

11. The shifter assembly of claim 10, wherein pivotal movement of the shift lever assembly from one gear selection location to another gear selection location includes corresponding movement of the detent plunger from one of the plurality of detent grooves to another one of the plurality of detent grooves and over one of the plurality of ridges positioned therebetween; and wherein movement of the detent plunger over the one of the plurality of ridges compresses the biasing member by a first amount greater than a second amount of compression associated with the plurality of detent grooves, the first amount of compression corresponding to a first downward force applied onto the coupling member and the second amount of compression corresponding to a second downward force applied onto the coupling member, the first downward force causing greater frictional resistance via the clutch system to pivotal movement of the shift lever assembly than the second downward force.

12. The shift lever assembly of claim 8, wherein the base defines first and second cut-outs extending from the female socket, the first and second cut-outs configured to receive first and second ends of the C-shaped flexible clutch member; and wherein the first and second ends of the C-shaped flexible clutch member each include a radially outwardly extending projection, the projections configured to be received in the first and second cut-outs.

13. The shift lever assembly of claim 3, wherein the electronic shift lever assembly includes a poly-stable electronic shift lever assembly; and wherein the detent member includes first and second spaced apart detent members and the cam member includes first and second spaced apart cam members, the first and second detent members being coupled to the pivot base.

14. A poly-stable electronic shifter assembly for a shift-by-wire transmission, comprising:

a base having an upper base member coupled to a lower base member positioned under the upper base member;

a shift lever assembly including a pivot base having a coupling member;

a detent system including a biasing member and a detent member associated with the shift lever assembly, the biasing member biasing the detent member into engagement with a cam member coupled to the upper base member; and a clutch system including a flexible clutch member and a bearing socket having a tapered bearing surface defined by the lower base member, the bearing socket configured to receive the coupling member with the flexible clutch member coupled thereto to pivotably couple the shift lever assembly to the base such that the flexible clutch member extends partially around the coupling member with an inner surface of the flexible clutch member bearing on the coupling member and an outer surface of the flexible clutch member engaging and reacting against the tapered bearing surface;

wherein the detent system is configured to apply a downward force onto the coupling member thereby causing corresponding downward movement of flexible clutch member relative to a decreasing diameter of the tapered bearing surface such that an inner diameter of the flexible clutch member is reduced thereby applying increased frictional force on the coupling member so as to cause increased frictional resistance to pivotal movement of the shift lever assembly and provide tuned frictional damping of the shift lever assembly during movement thereof proportional with a biasing force of the biasing member.

15. The shift lever assembly of claim 14, further comprising:

a pivot member coupled to the coupling member, the pivot member forming a male outer pivot surface of the coupling member; and wherein the coupling member with the pivot member and the flexible clutch member coupled thereto is pivotably positioned in the bearing socket such that the inner surface of the flexible clutch member bears on the pivot member and the outer surface of the clutch member engages and reacts against the tapered inner sidewall.

16. The shifter assembly of claim 15, wherein the downward force applied by the detent system urges the pivot base downward in a direction away from the cam member and the upper base member.

17. The shifter assembly of claim 16, wherein the flexible clutch member comprises a C-shaped flexible clutch member.

18. The shifter assembly of claim 17, wherein, in response to the downward force and corresponding downward movement of the pivot base, the C-shaped flexible clutch member expands in a circumferential direction thereby reducing the internal diameter thereof and applying the increased frictional force on the pivot member.

19. The shift lever assembly of claim 18, wherein the detent member includes first and second spaced apart detent members having respective first and second biasing members and the cam member includes first and second spaced apart cam members, the first and second detent members being coupled to the pivot base and biasing into engagement with the first and second cam members via the first and second biasing members.

* * * * *